Dec. 3, 1968 W. W. MURPHY 3,414,341
RETAINER WITH SEALS FOR THRUST BEARINGS
Filed April 11, 1966
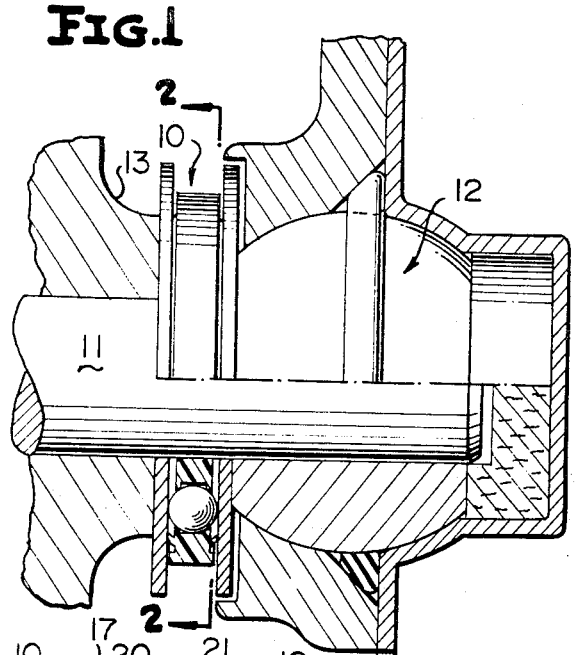
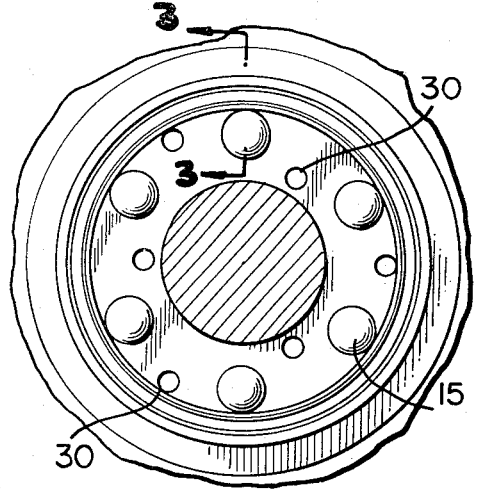
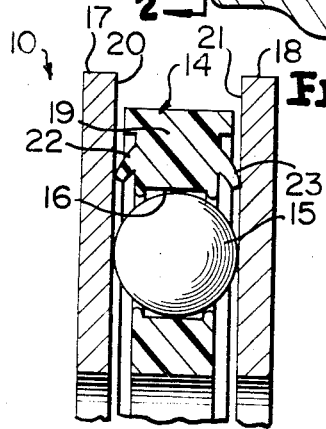
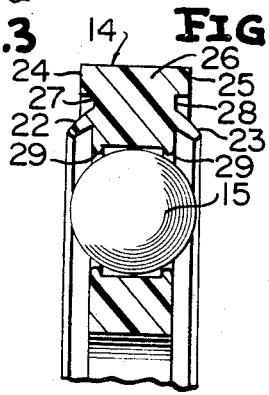
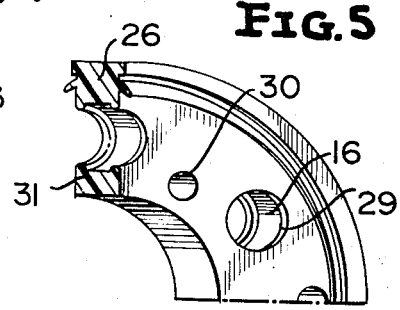
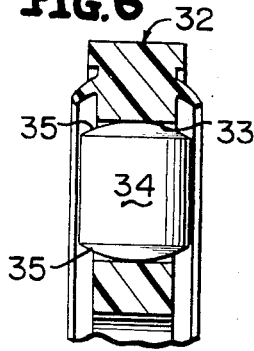
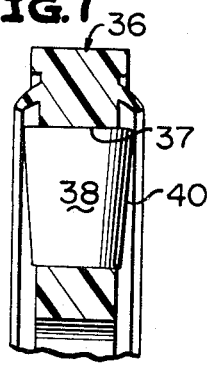
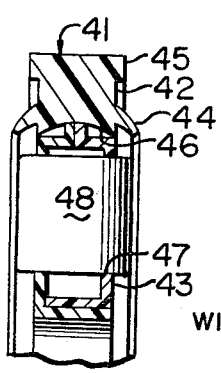
INVENTOR
WILLIAM W. MURPHY
BY
Mason, Porter, Diller & Brown
ATTORNEYS United States Patent Office 3,414,341
Patented Dec. 3, 1968

3,414,341
RETAINER WITH SEALS FOR THRUST BEARINGS
William Walter Murphy, Torrington, Conn., assignor to The Torrington Company, Torrington, Conn., a corporation of Maine
Filed Apr. 11, 1966, Ser. No. 541,745
15 Claims. (Cl. 308—235)

ABSTRACT OF THE DISCLOSURE

An axial thrust bearing retainer is provided, which may be constructed of a plurality of pieces, having pockets for receiving rolling elements therein, with sealing lips extending axially outwardly from each side of the retainer, and stops or abutment flanges extending axially from each side of the retainer for a distance less than the axial extension of associated sealing lips. The retainer may have rolling elements of various configurations, and is generally disposed between two washer-like members, for rolling contact of the rolling members thereagainst. The retainer may also have lubricating holes extending axially therethrough.

---

This invention relates in general to new and useful improvements in the bearing art, and more particularly to cages for rolling bearing elements which cages have sealing lips integral therewith.

It is the primary object of this invention to provide a cage for rolling bearing elements which cage includes annular circumferential sealing lips which cooperate with laterally adjacent surfaces for retaining a lubricant in confined relation about the rolling elements.

It is another object of this invention to provide an axial thrust bearing assembly including a cage having annular circumferential sealing lips on each side thereof in cooperation with thrust washers positioned adjacent each side of the cage, to enclose a volume for retaining a lubricant in contact with rolling bearing elements which are positioned within the cage.

It is still another object of this invention to provide a cage having pockets therein adapted to receive variously configured rolling bearing elements, the cage having annular circumferential sealing lips on each side thereof which resiliently engage adjacent contracting surfaces in lubricant-confining relation and with other peripheral flanges on the cage cooperating with the adjacent surfaces to limit resilient deformation of the sealing lips under a thrust load.

With the above and other objects in view that will hereinafter appear, the nature of this invention will be more clearly understood by reference to the following description, the appended claims and the several views illustrated in the accompanying drawing.

In the drawing:

FIGURE 1 is a fragmentary longitudinal sectional view, with portions shown in elevation, of a shaft assembly embodying an axial thrust bearing assembly of this invention, and illustrates a cage having rolling bearing elements received therein in contacting engagement with adjacent thrust washer surfaces, and positioned about a shaft between an axial thrust machine element and a radial thrust bearing.

FIGURE 2 is a fragmentary end elevational view of the shaft assembly of FIGURE 1, taken along line 2—2 of FIGURE 1, and illustrates a cage of this invention having balls received in cage pockets, and holes extending through the cage for the reception of a lubricant therein.

FIGURE 3 is an enlarged fragmentary vertical sectional view of the bearing assembly in FIGURE 1, taken along the line 3—3 of FIGURE 2, and illustrates the cooperation between the resiliently deformable cage sealing lips and adjacent thrust washer surfaces or races of this invention, in providing an enclosed volume for the lubricant about the rolling bearing elements.

FIGURE 4 is an enlarged fragmentary vertical sectional view of a cage and ball rolling element, taken along a line similar to that of 3—3 of FIGURE 2, and illustrates the undeformed disposition of the cage sealing elements of this invention, longitudinally outwardly of the ball rolling element with the adjacent washer surfaces removed to demonstrate the resilient feature of the sealing lips of the cage of this invention.

FIGURE 5 is a partial perspective view of the cage of FIGURE 2 and illustrates the outer axially extending peripheral abutting surfaces of the cage which limit the resilient deformation of the annular sealing lips, the rolling element pockets, and holes which extend through the cage and are adapted to receive a lubricant.

FIGURE 6 is an enlarged fragmentary vertical sectional view of another species of the cage of this invention, similar to that of FIGURE 4, but illustrates a cage pocket shaped to receive a straight roller bearing element.

FIGURE 7 is an enlarged fragmentary vertical sectional view of another species of the cage of this invention similar to that of FIGURE 4, but illustrates a cage pocket shaped to receive a tapered roller bearing element.

FIGURE 8 is an enlarged fragmentary vertical sectional view of yet another species of the cage of this invention similar to that of FIGURE 4, and illustrates a composite cage construction including an outer member with the sealing lips thereon in receiving engagement with an inner member, and a pocket carried by the inner member and adapted to receive a straight roller bearing element.

Referring now to the drawing in detail, reference is first made to FIGURE 1 wherein there is illustrated a bearing assembly 10 of this invention, positioned about a shaft 11 between a self-aligning radial bearing 12 and a machine element 13 which applies axial thrust through the bearing assembly 10 of this invention.

The bearing assembly 10 includes a cage or retainer 14, a plurality of circumferentially spaced ball-type rolling bearing elements 15 carried by the cage 14, and washers 17, 18.

The cage or retainer 14 comprises a ring 19 having an outer ring body portion 26, an inner ring body portion 31, opposite side walls 27, 28, circumferential sealing lips 22 and 23, and abutting flanges 24, 25.

The circumferential annular sealing lip portions 22, 23 of the cage 14 are normally disposed longitudinally outwardly of the side walls 27, 28 of the outer ring body portion 26 as shown in FIGURE 4. The circumferential annular peripheral projections or abutment flanges 24, 25 are positioned radially outwardly of the sealing lip portions 22, 23 respectively, on the outer ring body portion 26 of the cage 14 and extend axially outwardly from side wall portions 27, 28 for a distance less than the axial extension of the sealing lip portions 22, 23.

A plurality of pockets 16 are spaced about the cage 14 and extend through the inner ring body portion 31, said pockets being located entirely within the inner ring body portion 31, between opposite side wall portions 27 and 28 thereof. The pockets 16 have radially inward annular projections 29 or similar retaining means and are shaped to receive rolling elements 15 therein.

Lubricating holes or bores 30 may be constructed in the cage 14, extending through the inner ring body portion 31, spaced radially and circumferentially about the ring body portion 31 as desired. The holes or bores 30 are adapted to receive a lubricant, either of the oil or grease types, depending upon the desired application. The cage may be constructed of a molded plastic material, or other such suitable material as will result in the desired resiliency of the sealing lips.

The washers 17 and 18 are positioned adjacent opposite side walls 27, 28 of the cage 14 in rolling contacting engagement with ball bearing rolling elements 15 positioned within the sockets 16. Surfaces or races 20, 21 respectively of the washers 17, 18 engage the circumferential annular resilient sealing lip portions 22, 23 respectively in sliding contact. When the surfaces 20, 21 of the washers 17, 18 respectively are brought into contacting engagement with the rolling elements 15, the circumferential annular sealing lip portions 22, 23 are axially depressed an amount sufficient such that their inherent resiliency will enable a sufficient contact pressure to be effected between the sealing lip portions 22, 23 and the washer surfaces 20, 21 to retain the lubricant spaced radially inwardly of the sealing lip portions 22, 23 during the relative sliding engagement of the washers 17, 18 with the retainer 14.

The circumferential annular peripheral abutment flanges 24, 25 function to limit the axial depression of the sealing lip portions 22, 23 when an upper desirable limit of contact pressure is reached between the sealing lip portions and the washer surfaces 20, 21. The abutment flanges 24, 25 extend outwardly of the side walls 27, 28 of the cage 14 an amount less than the extension of the rolling elements 15 beyond the side walls 27, 28 to permit engagement of the rolling elements 15 with the surfaces 20, 21 of the washers.

The annular sealing lip portions 22, 23 possess such inherent resiliency that, when an abutment flange such as 25 is in contact with an adjacent washer surface 21, the sealing lip 22, on the opposite side of the cage 14 from the abutment flange 25, remains in resilient contacting engagement with the associated washer surface 20.

The cage 14 with the rolling elements 15 positioned therein may be utilized either with or without the washers 17, 18. When the cage and rolling elements are used without washers, adjacent machine surfaces function in the same manner as the washers 17, 18 although the inclusion of the washers in the assembly of this invention is preferred, in that the washers 17, 18 each provide a smoother surface for sealing engagement with the sealing lip portions 22, 23 of the cage 14.

In FIGURE 6 there is illustrated in greater detail, another cage 32 of this invention, constructed similar to the cage 14, but differing in that pockets 33 of the cage 32 are shaped to receive straight rollers 34 having rounded ends 35 thereon.

In FIGURE 7 there is illustrated in detail another cage 36 of this invention, constructed similar to the cage 14 but having pockets 37 shaped to receive tapered rollers 38 therein, for use in such applications where tapered rollers are desirable. When tapered rollers 38 are used it is desirable to also use complementally conically tapered washers (not shown) in roller engagement against the tapered surfaces 40 of the tapered rollers 38.

In FIGURE 8 there is illustrated in detail yet another cage 41 of this invention similar to the cage 14 but differing therefrom in that the cage 41 is constructed of concentrically disposed mating ring portions 42, 43. The radial outermost concentric ring portion 42 is constructed to have annular sealing lips 44 and abutment flanges 45 in the manner of the cage 14, but has a concave innermost surface 46 adapted to receive the separate inner concentric ring portion 43, which is of two-piece construction (as illustrated) and has a plurality of pockets 47 therein adapted to receive straight roller elements 48. The inner concentric retainer portion 43 may be constructed to have opposite sidewalls of metal while the outer concentric portion may be construction of plastic or other suitable material to enable the resilient functioning of the sealing lips 44.

It is to be understood that each of the elements received in the pockets of the various cages of this invention are recited generically as rolling bearing elements, which term includes the ball rolling elements 15 of FIGURE 4, the straight roller elements 34 of FIGURE 6, the tapered roller elments 38 of FIGURE 7, and the straight roller elements 48 of FIGURE 8.

Although only preferred embodiments of the invention have been described and illustrated herein, it is to be understood that minor modifications may be made in the bearing assemblies and cages of this invention within the spirit and scope of the invention, as defined in the appended claims.

I claim:

1. In an axial thrust bearing assembly of the anti-friction type, a retainer including an inner annular ring portion having opposite surface with axially opening pocket means therein for receiving a plurality of rolling bearing elements and an outer ring portion disposed radially outwardly of said inner ring portion, said outer ring portion having a resilient annular sealing portion extending axially outwardly of at least one of said surfaces, said outer ring portion and inner ring portion are separable portions; said inner ring portion being received within said outer ring portion.

2. In a bearing assembly, the retainer as set forth in claim 1 wherein said outer ring portion is of plastic construction and said inner ring portion is of metallic construction.

3. In an axial thrust bearing assembly of the anti-friction type, a retainer including an inner annular ring portion having opposite sidewalls with axially opening pocket means therein for receiving a plurality of rolling bearing elements and an outer ring portion disposed radially outwardly of said inner ring portion, said outer ring portion having a resilient annular sealing portion extending axially outwardly of each of said side walls, said annular sealing portion being integrally connected with said outer ring portion, and a peripheral spacer portion of said outer ring portion having annular peripheral flanges extending axially outwardly of each of said ring side walls for a distance less than the axial extensions of said annular sealing portions.

4. In an axial thrust bearing assembly of the anti-friction type, a retainer including an inner annular ring portion having opposite side walls with axially opening pocket means therein for receiving a plurality of rolling bearing elements and an outer ring portion disposed radially outwardly of said inner ring portion, said outer ring portion having a resilient annular sealing portion extending axially outwardly of at least one of said side walls, rolling bearing elements being rotatably received in said pockets, wherein said resilient annular sealing portion extends outwardly from both of said side walls, including a thrust washer mounted adjacent each of said sealing portions, and a plurality of holes extending through said ring portion for reception of a lubricant therein; said washers and said annular sealing portions cooperating to define a volume for retaining a lubricant encased therein.

5. A bearing assembly as set forth in claim 4 wherein said annular sealing portions resiliently engage adjacent washer surfaces to provide means for retaining sufficient contact pressure against said respective adjacent race surfaces to retain a lubricant within said annular sealing portions during longitudinal movement of said retainer with respect to at least one of said washers.

6. A bearing assembly as set forth in claim 5 further including a peripheral spacer portion outwardly of said outer ring portion having annular peripheral flanges extending axially outwardly of each of said ring side walls for a distance less than the axial extensions of said annular sealing portions; wherein said peripheral flanges provide means for limiting longitudinal depression of said seal portions with respect to at least one of said washers.

7. In an axial thrust bearing assembly of the anti-friction type, a retainer including an inner annular ring portion having opposite side walls with axially opening pocket means therein for receiving a plurality of rolling bearing elements and an outer ring portion disposed radially outwardly of said inner ring portion, said outer ring portion having a resilient annular sealing portion extending axially outwardly of at least one of said side walls, further including a spacer portion of said outer ring portion having at least one flange extending axially outwardly of at least said side wall having said sealing portion for a distance less than the axial extension of said sealing portion.

8. A retainer for anti-friction members comprising an annular structure having opposite surfaces, a plurality of pockets extending axially through said annular structure and the opposite surfaces thereof, annular sealing means extending axially beyond one of said surfaces, and abutment means extending axially of said one surface for a distance less than the axial extension of said annular sealing means.

9. The retainer as defined in claim 8 wherein said annular structure is formed from a pair of separate annular elements, said pockets are formed in both said annular elements, and said annular sealing means is radially outboard of said pockets.

10. The retainer as defined in claim 3 including additional annular sealing means and abutment means extending axially beyond the remaining one of said opposite surfaces.

11. In a bearing assembly, the retainer as set forth in claim 1 wherein said inner ring portion is formed by a pair of separate annular elements, and said outer ring portion includes another resilient annular sealing portion extending axially outwardly of the remaining one of said opposite surfaces.

12. In a bearing assembly, the retainer as set forth in claim 11 wherein said annular sealing portions are inclined radially inwardly toward the retainer axis.

13. In a bearing assembly, the retainer as set forth in claim 11 wherein at least one of said separate annular elements is received within an inwardly opening annular recess of said outer ring portion.

14. In a bearing assembly, the retainer as set forth in claim 7, further including a thrust washer mounted adjacent said resilient sealing portion and cooperating with said sealing portion to retain a lubricating substance inwardly of said sealing portion.

15. The retainer of claim 7, wherein said inner ring portion is of two-piece metal construction.

References Cited

UNITED STATES PATENTS 1,334,266   3/1920   Simmons _____ 308—235

FOREIGN PATENTS 151,705   9/1920   Great Britain.
590,163   7/1947   Great Britain.
875,225   8/1961   Great Britain.

MARTIN P. SCHWADRON, *Primary Examiner.*

FRANK SUSKO, *Assistant Examiner.*